W. B. EASON.
BUCKET BAIL.
APPLICATION FILED NOV. 20, 1907.
912,095.
Patented Feb. 9, 1909.
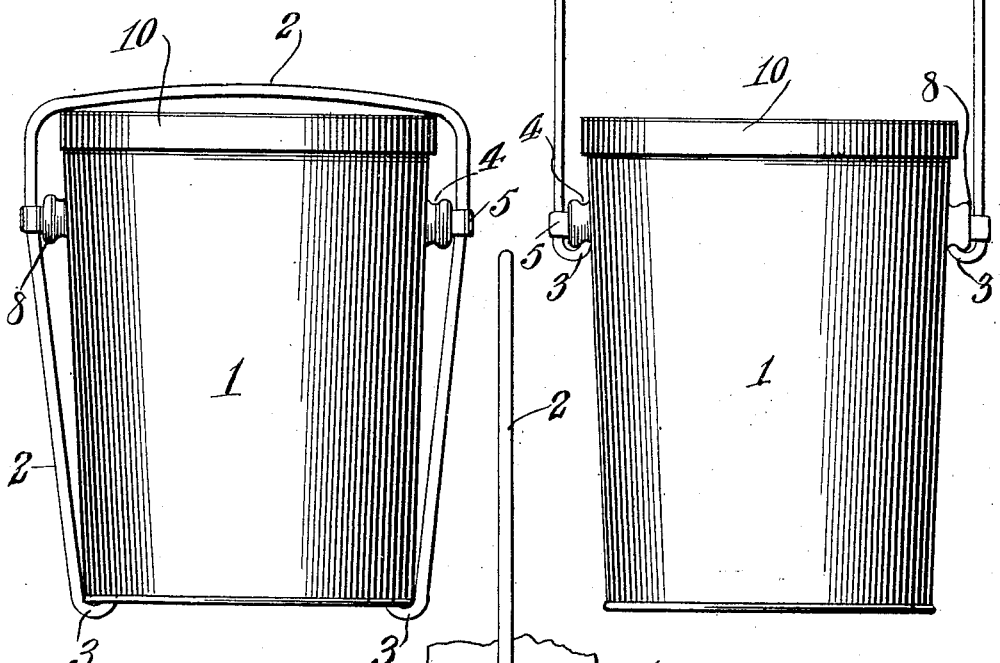

UNITED STATES PATENT OFFICE.

WILLIAM B. EASON, OF ERA, ARKANSAS, ASSIGNOR OF ONE-HALF TO ROBERT A. ENDSLEY, OF ERA, ARKANSAS.

BUCKET-BAIL.

No. 912,095.    Specification of Letters Patent.    Patented Feb. 9, 1909.

Application filed November 20, 1907. Serial No. 403,058.

*To all whom it may concern:*

Be it known that I, WILLIAM B. EASON, a citizen of the United States, residing at Era, in the county of Miller and State of Arkansas, have invented new and useful Improvements in Bucket-Bails, of which the following is a specification.

This invention relates to bucket bails, the object in view being to provide a practical and efficient bail for buckets and other vessels, by means of which a secure hold is taken by the bail upon the bucket close up to the surface of the bucket, the connection between the bail and the bucket being practically indestructible so as to prevent the bail from becoming detached from the bucket when subjected to unusual strains.

A further object of the invention is to provide a bail of such character and disposed in such relation to the bucket or vessel as to form, in one position of the bail, a fastening device for the lid or cover of such bucket or vessel.

With the above and other objects in view, the invention consists in the novel construction, combination and arrangement of parts hereinafter fully described, illustrated and claimed.

In the accompanying drawings:—Figure 1 is a side elevation of a bucket with the improved bail applied thereto. Fig. 2 is a similar view showing the bail in position to hold the lid on the bucket. Fig. 3 is an enlarged detail vertical section through one of the connections. Fig. 4 is a front elevation of the same.

In the drawings, 1 designates an ordinary bucket and 2 a bail which in its general form may be of any desired shape. In carrying out the present invention, the two extremities of the bail are bent or curved inward as shown at 3, substantially in the form of hooks, the points or extremities of which are designed to enter and engage grooves 4 formed in a pair of bail holders with which the bucket is provided at opposite sides as shown in Fig. 1.

Each bail holder comprises an eye 5 having a hole 6 therethrough through which one of the terminal portions of the bail passes as best shown in Fig. 3. The eye 5 is secured to and projects from a bail keeper which is preferably hollow and comprises a base flange 7 by means of which it is riveted, welded or otherwise secured to the outer surface of the bucket, and a head 8 located at a substantial distance from the base flange 7 to leave an annular groove 4 in which the extremity of the bail are received and in which said extremity is adapted to move as indicated in Figs. 1 and 2.

In connecting the eye 5 to the head 8, the shank of the eye is passed through an opening provided therefor centrally of the head 8 and the eye is then riveted or headed inside of the keeper as shown at 9 in Fig. 3. The eye 5 is adapted to turn in the hole which receives it and said hole is arranged centrally relatively to the groove 4 so that in swinging or turning the bail 2 from one side of the bucket to the other, the eye 5 holds the bail at all times in the same relation to the groove 4 on the keeper, the extremity of the bail traveling under said groove.

By reference to Fig. 2, it will be observed that the bail 2 may be pushed downward and the hooked extremities thereof carried beneath the lower edge or chime of the bucket or vessel to bring the upper handle portion of the bail down tightly upon the lid or cover 10 of the bucket or vessel, said lid or cover being thus tightly and securely held in place for storage or transportation purposes. The terminal portions of the bail which extend downward along the sides of the bucket have an inward spring toward each other as indicated in Fig. 2, whereby any tendency of the hooked extremities 3 to spring out of interlocked engagement with the bottom edge of the bucket, is overcome.

From the foregoing description, taken in connection with the drawings, it will be observed that the supporting points of the bail lie close up to the outer surface of the bucket where the parts are adapted to sustain the greatest strain, little or no strain being brought to bear on the eyes 5, the main function of which is to hold the terminal portions of the bail in proper relation to the keepers as described.

I claim:—

The combination with a bucket and a cover therefor, of a bail for said bucket having the extremities thereof recurved toward each other forming inturned hooks, bail holders for connecting the bail ends to the bucket, each bail holder embodying a keeper provided with an external annular groove in which the point of one of the hooks is adapted to engage and work, and a bail-receiving eye through which the bail is slidable, said eye having a swiveled connection with the keeper, the bail being of such length as to adapt the hooked extremities to catch under the chime of the bucket when said bail is slid downward, while the handle portion of the bail holds the cover in place.

In testimony whereof I affix my signature in presence of two witnesses.

WILLIAM B. EASON.

Witnesses:
   JESSIE LAWRENCE,
   CLEMIE EASON.